United States Patent
Peretti et al.

(10) Patent No.: US 6,184,259 B1
(45) Date of Patent: Feb. 6, 2001

(54) MATERIAL CONTAINING EXPANDABLE MICROSPHERES AND PROCESS FOR THE PRODUCTION THEREOF

(75) Inventors: Giorgio Peretti, Verona; Renzo Pasetto, Bussolengo, both of (IT)

(73) Assignee: Interplastica, S.r.l., Bussolengo (IT)

( * ) Notice: Under 35 U.S.C. 154(b), the term of this patent shall be extended for 0 days.

(21) Appl. No.: 09/297,233

(22) PCT Filed: Sep. 10, 1998

(86) PCT No.: PCT/IT98/00245

§ 371 Date: Apr. 26, 1999

§ 102(e) Date: Apr. 26, 1999

(87) PCT Pub. No.: WO99/14267

PCT Pub. Date: Mar. 25, 1999

(30) Foreign Application Priority Data

Sep. 16, 1997 (IT) .............................................. VR97A0082

(51) Int. Cl.$^7$ .................... C08J 9/32; C08J 9/34
(52) U.S. Cl. ............................ 521/54; 264/45.4; 521/51; 521/145
(58) Field of Search .................... 521/54, 51, 145; 264/45.4

(56) References Cited

U.S. PATENT DOCUMENTS

| | | | |
|---|---|---|---|
| 3,864,181 | 2/1975 | Wolinski et al. ....................... 156/79 |
| 4,108,806 | 8/1978 | Cohrs et al. ........................... 521/54 |
| 4,699,810 | 10/1987 | Blakeman et al. .................... 427/244 |
| 4,719,249 | 1/1988 | Dietlein et al. ....................... 523/179 |
| 4,946,737 | 8/1990 | Lindeman et al. .................... 428/283 |
| 5,272,001 | * 12/1993 | Weisman ............................... 521/54 |
| 5,332,760 | * 7/1994 | Weisman ............................... 521/54 |
| 5,418,257 | * 5/1995 | Weisman ............................... 521/54 |
| 5,520,961 | * 5/1996 | Lysell et al. ........................... 521/78 |
| 5,665,785 | * 9/1997 | McClellan et al. .................... 521/51 |
| 6,020,387 | * 2/2000 | Downey et al. . |
| 6,022,912 | * 2/2000 | Spitler .................................... 521/54 |

FOREIGN PATENT DOCUMENTS 0 513 930 A1    11/1992   (EP) .
1 525 787       11/1976   (GB) .
WO 95/08590     3/1995    (WO) .

* cited by examiner

Primary Examiner—Morton Foelak
(74) Attorney, Agent, or Firm—Oppenheimer, Wolff & Donnelly LLP

(57) ABSTRACT

A material for the production by extrusion or molding or calendering of light articles has a chemical formulation comprising at least a thermoplastic polymer. A predetermined amount of polymeric microspheres containing isopentane is added to said at least a thermoplastic polymer. A process for producing said material comprises a first step during which the thermoplastic polymer is mixed to further components (such as thermal stabilizers and/or costabilizers and/or additives) and a second step during which the mixture is granulated in order to obtain a granular compound. At the end of the first step, and advantageously immediately before the beginning of said second step, a predetermined amount of polymeric microspheres containing isopentane is added to the mixture. Said material is used for the production by injection molding or extrusion or calendering of light articles in the shoe industry, particularly of shoe soles.

8 Claims, No Drawings

MATERIAL CONTAINING EXPANDABLE MICROSPHERES AND PROCESS FOR THE PRODUCTION THEREOF

TECHNICAL FIELD

The present invention relates to a synthetic material obtained from a thermoplastic polymer, said material being advantageously used for the production of articles which are provided with good physical and mechanical properties as well as a remarkable lightness.

Besides, the present invention relates to a process for the production of said material and to the use of the above cited material to produce shoe components, advantageously soles.

The present invention is particularly applied to the production of light articles, e.g. articles manufactured by shoe industries, more particularly to the production of shoe soles.

BACKGROUND ART

The use of foamed polyvinylchloride (in the following PVC) for the production of many different articles which are obtained, for example, by means of the screw injection molding technique or by means of a transfer or intrusion device or by means of an extrusion process is well known in the art.

Generally, to carry out said techniques a material is used which is based on foamed PVC, said foamed PVC being combined with suitable additives which provide the final product with suitable physical and mechanical properties and which improve its production process.

Among said additives, we can mention, for instance, the plasticizers which have the specific function to soften the starting polymer; the stabilizers which prevent occuring of undesired thermal and/or light degradations; the internal and/or external lubricants which allow the material to be easily worked.

However, it is also known that the products obtained from a material which is based on foamed PVC suitably combined with the above cited additives involve some inconveniences and drawbacks which remarkably limit the use of said products.

First of all, the articles obtained by a material which is based on a traditional foamed plasticized PVC as described above are characterized by a density value which is generally higher than 0.7 g/cm$^3$, thus said articles are inevitably rather heavy.

Instead, lightness is a very important feature in the production of many different articles, e.g. shoe soles as mentioned above.

A further drawback of the articles belonging to the state of the art and obtained from the above cited material consists in that their external surface generally shows clearly evident streakings caused by the generation of consistent amounts of gazeous products produced by the decomposition of the foaming agent of the starting composition.

It appears to be clear that said streakings are not desirable since they provide the finished product with a poor aesthetical aspect which is absolutely unacceptable for particular kinds of products.

In addition to the above cited streakings, which lower the quality of the article, gazeous bubbles can be formed inside of it. Said Bubbles are uncontrollably generated during the production process and can also have remarkable dimensions.

It is evident that said gazeous bubbles are absolutely undesirable since they can cause swellings and, generally, a decrease of the mechanical properties of the article as well the lowering of the quality thereof.

A further aspect which is very important in specific applications consists in that foamed PVC does not provide the finished product with excellent physical and mechanical properties, e.g. with a satisfactory abrasion resistance.

Owing to the above cited disadvantages and drawbacks caused by the use of a material which is based on foamed PVC, it is often preferable to replace said PVC with other kinds of polymers, e.g. foamed bicomponent polyurethane.

In fact, although foamed bicomponent polyurethane is more expensive as well as more difficult to be molded and treated during the production process than foamed PVC, it allows to produce very light articles having very high superficial quality.

DESCRIPTION OF THE INVENTION

The present invention aims to obviate the disadvantages and drawbacks which are typical of the background art, and to provide, thus, for a material comprising a thermoplastic polymer as main component, said material being advantageously light and characterized by good physical and mechanical properties.

This is achieved by means of a material having the features disclosed in claim 1.

The dependent claims outline particularly advantageous forms of embodiment of the material according to the invention.

Besides, the present invention concerns a process for the production of a granular material which is based on a thermoplastic polymer suitable for being successively molded or extruded to obtain a plurality of articles, e.g. shoe components.

Said process is carried out by means of the features disclosed in claim 13.

The claims dependent on claim 13 outline particularly advantageous forms of embodiment of the process according to the invention.

Finally, the present invention concerns the use of a material as disclosed above for the production of shoe components, particularly soles.

Said use is disclosed in claim 16.

According to an important feature of the present invention, the chemical formulation of the material which is used to produce light articles comprises at least a thermoplastic polymer to which polymeric microspheres containing isopentane are added.

More preferably, the term "thermoplastic polymer" indicates a foamed PVC resin, but it is evident that any cured rubber can be advantageously used, e.g. a styrene-butadiene rubber (SBR) or any other thermoplastic polymer.

As cited above, in addition to the thermoplastic polymer of the starting composition, the material according to the present invention comprises polymeric microspheres containing isopentane.

Said microspheres act as foaming agent and are added in amounts of some parts per 100 parts of thermoplastic polymer according to the kind of thermoplastic polymer which is used and according to the article to be produced, i.e. according to the features as well as to the physical and mechanical properties to be provided to said article.

According to a particularly preferred form of embodiment of the invention, the polymeric coating which is used to obtain said microspheres is methacrylonitrilepolymethylmethacrylate, said microspheres being for instance marketed under the trade name EXPANCEL®.

Said polymeric microspheres containing isopentane are added during the preparation of the material and, more particularly, at the end of the mixing stage of the components since it is very important that said microspheres do not break and do not expand before a predetermined instant of time.

Successively, when said microspheres expand, i.e. during the molding or the extrusion stage of the article or during the calendering stage, said microspheres undergo a structural collapse due to the temperature effect; however, said structural collapse does not cause the breaking of the microspheres.

Thus, a changement of the microspheres surface occurs, said surface becoming sufficiently flexible to allow the expansion of the isopentane which is contained inside of said microspheres avoiding the gas escaping from the latter as well as their consequent breaking.

Therefore it is also necessary that the extruder is operated in order not to break said microspheres, the extruder being placed downstream of a turbomixer and having the specific function to turn the previously obtained material into granules.

In the same way, also the successive molding stage, e.g. the injection molding, to obtain any kind of article has to be operated by taking care that any adjustment of the principal parameters, e.g. rate, pressure, temperature, is carried out in order to avoid the breaking of the polymeric microspheres containing isopentane and to assure their expansion at a predetermined instant of time.

In the case where a given article is not produced by injection molding, but it is obtained by extrusion or calendering, it is evident that similar expedients have to be adopted so as to maintain the integrity and the expansion of said microspheres.

Since the microspheres are added to the mixture after the mixing of the other components and, advantageously, immediately before the granulation stage, it is possible to obtain a granular material inside of which the microspheres are integer and not expanded; in fact, said expansion will occur only in the final molding or extrusion or calendering stage of a given article, e.g. shoe soles.

In such a way the final article is provided with the physical, chemical and mechanical properties desired to obtain a light product of high quality.

Besides, the material surface is provided with good aesthetical features so that, if the material is used to produce shoe soles, even after the carding stage it shows an integer and smooth surface without imperfections which are generally due to the breaking of large cells during the production process.

One or more plasticizers are generally added to the basical formulation of the material according to the present invention.

In fact, said plasticizers act in such a way as to soften the composition, thereby providing for remarkable advantages during the production process as well as conferring specific properties to the final product.

The presence of said plasticizers is important also for determining the desired mix hardness, said hardness varying according to the ratio thermoplastic polymer/plasticizer which is used.

This aspect is particularly relevant in the field of producing shoe soles.

Among the plasticizers the use of di-2-ethyl-esilphthalate (DOP) is particularly preferred.

Besides, according to the present invention, it is possible to add further additives to the starting composition inside of the turbomixer in order to improve the physical and chemical features as well as the mechanical properties and the workability of said material.

Among said additives we may list, for instance: some thermal stabilizers, e.g. barium and zinc as well as calcium and zinc as well as barium and lead; suitable costabilizers, e.g. epoxidate oil of soya; any other further additives to improve the molding of the material and to increase its lubrication, e.g. stearic acid.

Thus, the material according to the present invention allows density values to be reached which are remarkable lower than those typical of similar materials belonging to the state of the art, said lower values being comprised in the range from 0.2 to 0.65 $g/cm^3$, and more advantageously from 0.4 to 0.5 $g/cm^3$; furthermore, also good physical and mechanical properties as well as high aesthetical results are achieved.

A further object of the present invention relates to the use of the material according to the invention in the shoe industry, specifically in the production of shoe soles.

Thus, the present invention relates to a specific material, the chemical formulation of which allows a light article to be produced which is provided with good physical and mechanical properties as well as with high quality surface appearance since no disadvantageous and undesirable streakings or internal bubbles are present as it occurs in articles produced by means of other formulations known in the art as cited above.

DESCRIPTION OF A FORM OF EMBODIMENT

The material according to the present invention is obtained by means of devices which are already known in the art and which are used for the production of thermoplastic materials, e.g. a turbomixer downstream of which is positioned an extruder provided to turn the mixed material into granules.

According to an important feature of the invention, the polymeric microspheres containing isopentane are added to the mixture at the end of the mixing stage, advantageously immediately before mixture is turned into granules.

In this way, and taking particular care of the operating parameters of the extruder-granulator, e.g. the thermal profile of the extruder and the extrusion rate, a relevant aspect of the present invention is to succeed in obtaining granules most of which are provided with microspheres which are still intact and not expanded, said expansion occurring during the successive molding stage.

According to a further form of embodiment of the process, the polymeric microspheres containing isopentane are added inside of the extruder-granulator in correspondence of one of its latest stages.

For example, inside of an extruder-granulator comprising eight or nine stages, the microspheres are added during one of the latest two or three stages before the obtainement of the finished material, preferably during the last stage.

In the following are shown some non-limiting examples of the starting compositions which can be used to produce the material according to the invention.

EXAMPLE I

The following is a particular formulation of the material according to the present invention, advantageously used in shoe industries:

| | |
|---|---|
| suspended PVC resin | 100 |
| plasticizer | 65 |
| ESBO | 4 |
| stabilizer | 4 |
| stearic acid | 1 |
| polymeric microspheres containing isopentane | 6 | wherein said amounts are indicated in parts per 100 parts of resin and wherein ESBO is epoxidate oil of soya.

EXAMPLE II

The following is a further formulation of the material according to the present invention:

| | |
|---|---|
| suspended PVC resin | 100 |
| DOP | 45 |
| DIBP | 15 |
| ESBO | 5 |
| stabilizer (Ba-Zn) | 5, 5 |
| stearin | 1 |
| polymeric microspheres containing isopentane | 6 | wherein said amounts are indicated in parts per 100 parts of resin and wherein DIBP is di-isobutyl-phthalate.

EXAMPLE III

The following is a further formulation of the material according to the present invention:

| | |
|---|---|
| suspended PVC resin | 100 |
| DOP | 50 |
| DIBP | 20 |
| ESBO | 5 |
| stabilizer (Ba-Zn) | 5, 5 |
| stearin | 1 |
| polymeric microspheres containing isopentane | 5 |
| AZDC | 0, 3 | wherein said amounts are indicated in parts per 100 parts of resin and wherein AZDC is azodicarboamide, generally used as foamed agent.

EXAMPLE IV

The following is a further formulation of the material according to the present invention:

| | |
|---|---|
| suspended PVC resin | 100 |
| DOP | 20 |
| DIBP | 15 |
| ESBO | 5 |
| stabilizer (Ca-Zn) | 5, 5 |
| stearin | 1 |
| polymeric microspheres containing isopentane | 5 |
| AZDC | 0, 3 | wherein said amounts are indicated in parts per 100 parts of resin.

EXAMPLE V

The following is a further formulation of the material according to the present invention:

| | |
|---|---|
| Europrene Solt 177 | 130 |
| Calprene 485 | 125 |
| paraffinic oil | 45 |
| polymeric microspheres containing isopentane | 12 |
| AZDC | 0, 4 |
| zinc of stearate | 0, 3 | wherein, in this case, instead of the traditional PVC resin, a thermoplastic rubber (Europrene Solt 177+Calprene 485) is used.

As cited above, in order to achieve the aim of the present invention it is necessary that the polymeric microspheres containing isopentane, which have to be added during the production of the material and more specifically at the end of the mixing cycle, do not break and do not expand before a predetermined time.

Therefore, it is necessary to carefully operate the extruder which is downstream of the mixing stage in order to obtain a granular material inside of which the microspheres are and have to be maintained integer and not expanded till the suitable molding or extrusion or calendering time of the finished article.

This means that, according to the present invention, it is very important that the operating parameters of the extruder-granulator, e.g. the thermal profile of the extruder and the extrusion rate, have to be maintained under control and inside of suitable ranges in order to obtain granules the most of which are provided with microspheres still intact and not expanded, said expansion occurring during the successive molding or extrusion stage of the finished article.

According to a particular form of embodiment of the present invention, the extruder-granulator is operated at the lowest temperature which is technically allowed to realize a steady link among the components of the mixture introduced inside of said extruder-granulator, and at the most suitable rate for avoiding the breaking of the microspheres.

Table I, represented in the form of a comparative table, shows a working example of an extruder which is positioned downstream of the mixing stage; in said example the temperature inside of the different zones of the extruder (indicated with numbers from 1 to 9) and the rate of the worm of said extruder are considered as the principal working parameters of the extruder.

Furthermore, the presence of the filter, which is positioned at the end of the extruder-granulator, has been considered as a further process parameter.

Said example compares the temperature and rate values of the extruder when a traditional formulation of PVC is used and when a material according to the present invention is used, the thermoplastic polymer of said material being PVC.

TABLE I

WORKING PARAMETERS OF THE EXTRUDER

| | Traditional formulation with PVC | Material according to the invention based on PVC |
|---|---|---|
| ZONE 1 | 140° C. | 80° C. |
| ZONE 2 | 150° C. | 90° C. |
| ZONE 3 | 160° C. | 100° C. |

TABLE I-continued

WORKING PARAMETERS OF THE EXTRUDER

| | Traditional formulation with PVC | Material according to the invention based on PVC |
|---|---|---|
| ZONE 4 | 160° C. | 110° C. |
| ZONE 5 | 155° C. | 105° C. |
| ZONE 6 | 150° C. | 100° C. |
| ZONE 7 | 145° C. | 95° C. |
| ZONE 8 | 140° C. | 90° C. |
| ZONE 9 | 135° C. | 85° C. |
| Worm rounds | 30 rpm | 18 rpm |
| Filter | present | not present |

What is claimed is:

1. A process for the production of shoe soles by means of a manufactured molded material based on polyvinylchloride, said process comprising:

in a first step, creating a mixed blend of a polyvinylchloride material with at least one of a thermal stabilizer, a co-stabilizer, and a plasticizer, thereby to obtain a mixture;

in a second step, adding to the mixture a predetermined amount of polymeric microspheres containing isopentane, the second step being carried out under a strictly controlled thermal condition in order to essentially avoid both breaking and expansion of said microspheres, and thereby to create a blended composition;

in a third step, extruding and granulating the blended composition from the second step, whereby the thermal conditions being at a temperature less than about 110° C. and the extrusion rate of the extruder are kept under strict control in order to essentially avoid both breaking and expansion of said microspheres, said third step resulting in a granulated material based on polyvinylchloride material containing microspheres which are essentially integral and unexpanded; and subsequently heating and injection molding the extruded granulated material in a shoe sole mold to obtain shoe soles, whereby an expansion of said microspheres essentially only occurs during the heating and injection molding within the shoe sole mold.

2. A process for the production of shoe soles by means of a manufactured material based on polyvinylchloride, said process comprising:

a first step wherein polyvinylchloride is mixed with at least one of a thermal stabilizer, co-stabilizers, and a plasticizer thereby providing a mixture;

a second step of pouring the mixture from said first step into a multistage extruder/granulator;

adding a predetermined amount of polymeric microspheres containing isopentane to the mixture inside one of the latest stages of said multistage extruder/granulator, said addition being before effecting granulation of the mixture, the thermal conditions being at a temperature less than about 110° C. and the extrusion rate of the extruder/granulator being kept under strict control in order to essentially avoid both breaking and expansion of said microspheres, and wherein said second step results in an extruded granulated blended mixture of material based on polyvinylchloride containing microspheres which are essentially integral and unexpanded; and subsequently heating and injection molding in a shoe sole mold the granulated blended mixture to obtain shoe soles material, and effecting an expansion of said microspheres essentially only within the shoe sole mold.

3. A process as claimed in any one of claims 1 or 2 wherein there is essentially no other foaming agent other than microspheres contained therein.

4. A process according to any one of claims 1 or 2 wherein said extruder/granulator is operated at about the lowest temperature technically suitable for obtaining steady links among the components of the mixture introduced inside of the extruder, and at rate suitable for avoiding the breaking of the microspheres.

5. A process as claimed in any one of claims 1 or 2 wherein a rotational speed of the extruder/granulator is about 60% of the normal rotation speed of the extruder/granulator.

6. A process as claimed in any one of claims 1 or 2 wherein a rotational speed of the extruder/granulator effects no filtering.

7. A process as claimed in any one of claims 1 or 2 wherein the PVC is a suspension product.

8. A process according to any one of claims 1 or 2 wherein the production of molded or extruded product has a density value comprised in the range from about 0.2 g/cm$^3$ to about 0.65 g/cm$^3$.

* * * * *